United States Patent
Trachanas et al.

(10) Patent No.: US 11,292,269 B2
(45) Date of Patent: Apr. 5, 2022

(54) METHOD FOR DETECTING AND COMPENSATING FOR DEFECTIVE PRINTING NOZZLES IN AN INKJET PRINTING MACHINE FOR REDUCING UNUSABLE PRINTS

(71) Applicant: Heidelberger Druckmaschinen AG, Heidelberg (DE)

(72) Inventors: Ilias Trachanas, Plankstadt (DE); Mina Hakim Latif Abosetta, Mannheim (DE); Andreas Fehlner, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/170,999

(22) Filed: Feb. 9, 2021

(65) Prior Publication Data
US 2021/0268806 A1    Sep. 2, 2021

(30) Foreign Application Priority Data
Feb. 28, 2020  (EP) ..................................... 20159963

(51) Int. Cl.
*B41J 2/21* (2006.01)

(52) U.S. Cl.
CPC ........... *B41J 2/2139* (2013.01); *B41J 2/2142* (2013.01)

(58) Field of Classification Search
CPC ...... B41J 2/2142; B41J 29/393; B41J 2/2139; B41J 2/16579; B41J 2/0451
See application file for complete search history.

(56) References Cited

U.S. PATENT DOCUMENTS

| | | | |
|---|---|---|---|
| 10,603,923 B2 | 3/2020 | Muehl et al. | |
| 2013/0141484 A1 | 6/2013 | Kasai et al. | |
| 2019/0105895 A1* | 4/2019 | Muehl | B41J 2/2139 |
| 2019/0160809 A1* | 5/2019 | Neeb | B41J 2/2142 |
| 2019/0248153 A1 | 8/2019 | Muehl et al. | |

FOREIGN PATENT DOCUMENTS

| | | |
|---|---|---|
| DE | 102018202027 B3 | 11/2018 |
| DE | 102018107105 A1 | 9/2019 |
| DE | 102019208149 A1 | 1/2020 |
| JP | 2013111768 A | 6/2013 |
| WO | 2015167561 A1 | 11/2015 |
| WO | 2020022024 A1 | 1/2020 |

* cited by examiner

*Primary Examiner* — Jannelle M Lebron
(74) *Attorney, Agent, or Firm* — Laurence A. Greenberg; Werner H. Stemer; Ralph E. Locher

(57) ABSTRACT

A method for detecting and compensating for defective printing nozzles in an inkjet printing machine includes printing test sheets each including at least one printing nozzle test chart and at least one gray area for every color separation. The test sheets are recorded and digitized with subsequent pixel-nozzle mapping and amplitude/phase value determination by using a computer. Current measurements are taken at the printing nozzles in between test sheets and customer sheets while being printed. The computer is used for teaching in a SVM model with the results of the current measurement and pixel-nozzle mapping and amplitude/phase determination. The taught-in SVM model and the current measurements are applied to printed, recorded and digitized customer's images to detect defective printing nozzles during production printing on the inkjet printing machine and the detected defective printing nozzles are compensated for.

5 Claims, 3 Drawing Sheets

METHOD FOR DETECTING AND COMPENSATING FOR DEFECTIVE PRINTING NOZZLES IN AN INKJET PRINTING MACHINE FOR REDUCING UNUSABLE PRINTS

CROSS-REFERENCE TO RELATED APPLICATION

This application claims the priority, under 35 U.S.C. § 119, of European Patent Application EP 20159963.6, filed Feb. 28, 2020; the prior application is herewith incorporated by reference in its entirety.

BACKGROUND OF THE INVENTION

Field of the Invention

The invention relates to a method for detecting and compensating for defective printing nozzles in an inkjet printing machine and for optimizing the process in terms of unusable prints.

The technical field of the invention is the field of digital printing.

When inkjet printing machines are in operation, one of the crucial parameters that determine the image quality of the printed products that are created is the condition of the printing nozzles of the inkjet printing heads that are used in the printing machine. The condition of the printing nozzles may be described in more detail on the basis of various characteristics, among them the amount of ink they apply, also referred to as the nozzle amplitude, as well as the deviation of the printed dot of an individual printing nozzle from the respective desired location, also known as the phase of the printing nozzle. In addition to those parameters, there are further important parameters such as the impulse response of the actuating signal of the individual piezoelectric elements for regulating the ink jetted by the individual printing nozzle. If the condition of a printing nozzle deteriorates—a fact that may be quantified and evaluated on the basis of those parameters—a printing nozzle may fail completely or its printing behavior may deteriorate to such an extent that the nozzle needs to be deactivated. In both cases, the defective printing nozzle needs to be compensated for. However, that involves an increased constructional and financial effort. A more preferred approach in multicolor printing is to use the other colors at the location of a defective printing nozzle to compensate for the failed or defective printing nozzle or, in single-color or multicolor printing, to compensate by increasing the amount of ink jetted by immediately adjacent printing nozzles.

There are various known approaches to detecting defective printing nozzles, among them are, for instance:
1. Detection by using a printed printing nozzle test chart that is subsequently evaluated.
2. Detection by using a gray value/solid-tone area printed on test sheets subsequently to be evaluated because in such areas defective printing nozzles are especially easy to identify. Self-learning algorithms such as a SVM (Support Vector Machine) model may additionally assist in the evaluation of the gray value/solid-tone area.
3. The evaluation of a gray value/solid-tone area but online during production printing.
4. Preventive detection by using current measurements at the printing head.
5. Detection by searching for "white lines" (camera pixels) in the digitally recorded image of the customer.

However, each one of those approaches has specific disadvantages. For instance, detection by using a printed printing nozzle test chart involves an extremely high number of false positives at a 100% detection rate, a lot of unusable prints, sluggish detection of defective nozzles only after seven sheets, for instance, if one test chart is printed with color rotation, and no inherent prevention. Detection by using a gray value/solid-tone area printed on a test sheet also involves unusable prints, is a sluggish defective nozzle detection process and likewise does not include prevention measures. An evaluation of gray value/solid-tone area online during production printing is highly dependent on compensation parameters, wastes a lot of paper because multiple gray value/solid-tone areas are required at the trailing edge of the sheet, and likewise does not include prevention measures. In contrast, preventive detection by using current measurements at the printing head requires complex hardware, whereas detection by searching for white lines does not directly identify the actual defective nozzle.

In that context, German Patent DE 10 2018 202027 B3, corresponding to U.S. Pat. No. 10,603,923, discloses a method of detecting defective printing nozzles in an inkjet printing machine including a computer. For detection purposes, at least one printing nozzle test chart and an area coverage element in a geometric association with the multi-row printing nozzle test chart are printed, both elements are recorded by using at least one image sensor and evaluated by using the computer, allowing the computer to detect defective printing nozzles on the basis of thresholds, and the detected printing nozzles are compensated for. The method is distinguished by evaluating the recorded area coverage element, the computer detects print defects and allocates the print defects to a respective area of geometrically proximate printing nozzles and the printing nozzles that cause the respective defect are identified by evaluating the printing nozzle test chart in that area.

BRIEF SUMMARY OF THE INVENTION

It is accordingly an object of the invention to provide a method for detecting and compensating for defective printing nozzles in an inkjet printing machine for reducing unusable prints, which overcomes the hereinafore-mentioned disadvantages of the heretofore-known methods of this general type as much as possible and which is more efficient than the known methods of the prior art.

With the foregoing and other objects in view there is provided, in accordance with the invention, a method for detecting and compensating for defective printing nozzles in an inkjet printing machine by using a computer, the method comprising the steps of printing test sheets, each test sheet including at least one printing nozzle test chart and at least one gray area for every color separation that is used, recording and digitizing the test sheets including subsequent pixel-nozzle mapping and amplitude/phase value determination by the computer, taking current measurements at the printing nozzles in between the printing of the test sheets, detecting whitelines by means of a camera, teaching in a SVM model with the results of the current measurement and the pixel-nozzle mapping and amplitude/phase value determination by the computer, applying the taught-in SVM models to the printed customer's images during the production run of the inkjet printing machine to detect defective printing nozzles, and compensating for the detected defective printing nozzles.

Thus, the core of the method of the invention is to select individual elements of the known detection methods of the prior art and to combine them in such a way that their advantages are maintained but their disadvantages are avoided as much as possible. Thus, the method of the invention provides better detection quality than the individual detection processes are capable of providing on their own, which means that in effect, due to the combination, the method of the invention achieves more than the total of the individual components known from the prior art. For instance, the method of the invention only requires printing and evaluating the printing nozzle test chart and the at least one gray area with the test sheet in the start-up phase and using it to carry out the pixel-nozzle mapping and the amplitude and phase value determination of the individual printing nozzles. This is then used to teach in a machine learning algorithm in the form of a SVM model, which during production printing only checks the customer's images, i.e. the actual image objects to be printed, to detect defective printing nozzles in a targeted way. Thus, during production printing, no further printing nozzle test charts or gray areas need to be printed anymore, a fact which reduces the amount of waste paper that is being produced to a considerable extent.

Compared to the prior art approach of detecting defective printing nozzles only in the customer's image right from the start, an advantage of the method of the invention is that it works in a much more targeted way and at a better detection quality due to the targeted teaching-in of the SVM model with a printing nozzle test chart and a gray area and the checking of the respective amplitude and phase values.

Advantageous and thus preferred further developments of the method will become apparent from the associated dependent claims and from the description with the associated drawings.

A further preferred development of the method of the invention in this context is that current measurements continue to be taken at the printing nozzles between individual print sheets that are being printed during production printing and evaluated by the computer, which then preventively deactivates and compensates for printing nozzles that are conspicuous in terms of the current measurements. This improves the quality of the detection even more because then the SVM model, which has likewise been taught in with respect to the results of the current measurement on the printing nozzles between the test sheets that are being printed, may be applied to continuous current measurements. Since these continuous current measurements are always taken between individual print sheets that are being printed during production printing and no printing speed reductions are required in this process, the performance of the printing operation is not affected and the detection result is improved at the same time.

Another preferred development of the method of the invention in this context is that in the process of recording and digitizing the test sheets, the computer checks the at least one gray area for potential print defects and excludes the results of the current measurement and amplitude/phase determination of those printing nozzles that are in the specific environment of the potential print defects from the teaching-in of the SVM model. This is necessary to ensure that the results of printing nozzles that assuredly operate within the defined characteristic value thresholds, i.e. are not defective, are used to teach in the SVM model. Otherwise the taught-in SVM model would include print defect data, a fact that would prevent the application of the model for successful detection. In this context it is important to note that the SVM model is taught in on the basis of functioning printing nozzles to allow the SVM model to detect nozzles that deviate from the desired behavior in a targeted way. Theoretically, a reverse operation would be conceivable, namely teaching in the SVM model on the basis of undesired behavior corresponding to defective printing nozzles and having the SVM model make the detection based thereon. However, the result would be focused on detecting functioning printing nozzles and would involve a massively increased effort because in an inkjet printing machine that is fit for production, the large majority of all printing nozzles are functioning nozzles.

An added preferred development of the method of the invention in this context is that if the computer does not find any printing nozzles with deviating amplitude and/or phase values in the specified environment of the potential print defects, three further gray areas for the color separation in question are printed in addition to a gray area without printing nozzle compensation for detecting defective printing nozzles and to the printing nozzle test chart for amplitude/phase value determination. The three gray areas include one in which the printing nozzle that has been identified by using pixel-nozzle mapping has been deactivated and compensated for, one in which the neighboring printing nozzle to the left has been deactivated and compensated for, and one in which the neighboring printing nozzle to the right has been compensated for. The computer identifies the printing nozzle that causes the potential print defect by evaluating the three gray areas. In some cases, there may be a high probability for print defects in the printed gray value areas or, alternatively, in the generated print, to be caused by a defective printing nozzle even though the amplitude and phase values from the printing nozzle test chart seem normal. In most cases, the actual printing nozzle that has caused the defect is to be found in the vicinity of the region that has been examined. Therefore, in this case, three further gray areas are printed in one of the following test sheets. In this process, the nozzle that was originally associated with the defect is compensated for in the middle gray value field and the neighboring nozzles to the left and right, respectively, are likewise compensated for in a further gray area printed for this purpose; then the gray areas are evaluated in a corresponding way. In most cases, this process allows the defective printing nozzle that caused the defect to be identified.

An additional preferred development of the method of the invention in this context is that during production printing, potential print defects in the customer's images that have been created are searched for, and the printing nozzle that has caused the potential print defect is determined by using the taught-in SVM model. During production printing, the process of finding potentially defective printing nozzles in the gray value areas as it is done on the test sheets is applied to the printed customer's images that have been printed as well as recorded and digitized by the image recording system. The taught-in SVM model then checks these potential print defects in the generated customer's images to find out whether or not they relate to defective printing nozzles. For this purpose, it refers to the correlations it learned during the set-up phase when it was taught the amplitude and phase values that correspond to a defective printing nozzle and how they manifest as print defects in a gray value image that is similar to a printed image/customer's image. This likewise applies to the correlation between the results of the current measurement at the printing nozzles that are located in the position of the potentially defective printing nozzles as determined on the basis of the gray value area. This knowledge enables the taught-in SVM model to assess whether image defects in the customer's image correspond to gray area image defects that correspond to a printing nozzle that is defective in terms of phase values, amplitude values and the result of the current measurement.

A concomitant preferred development of the method of the invention in this context is that both the test sheets and the printed images created during production printing are recorded and digitized by using an inline image recording system and evaluated and that the computer is an image-processing computer of the inline image recording system. It would be conceivable even for the teaching-in of the SVM model to rely on data that have been collected externally, i.e. downstream of the delivery and only on the basis of existing printed test sheets. Nevertheless, that would be much more difficult to handle and much slower than using an image recording system that is included in most inkjet printing machines anyway, operates inline and in most cases has thus been installed downstream of the last printing unit. Moreover, a quick evaluation of the produced prints by using the SVM model is required during production printing to detect defective printing nozzles as early as possible and thus to avoid an increased amount of unusable prints. External systems are hardly capable of providing such a quick evaluation.

Other features which are considered as characteristic for the invention are set forth in the appended claims.

Although the invention is illustrated and described herein as embodied in a method for detecting and compensating for defective printing nozzles in an inkjet printing machine for reducing unusable prints, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in constructional and/or functional terms will be described in more detail below with reference to the associated drawings and based on at least one preferred exemplary embodiment. In the drawings, mutually corresponding elements have the same reference symbols.

DETAILED DESCRIPTION OF THE INVENTION

Figure 1:
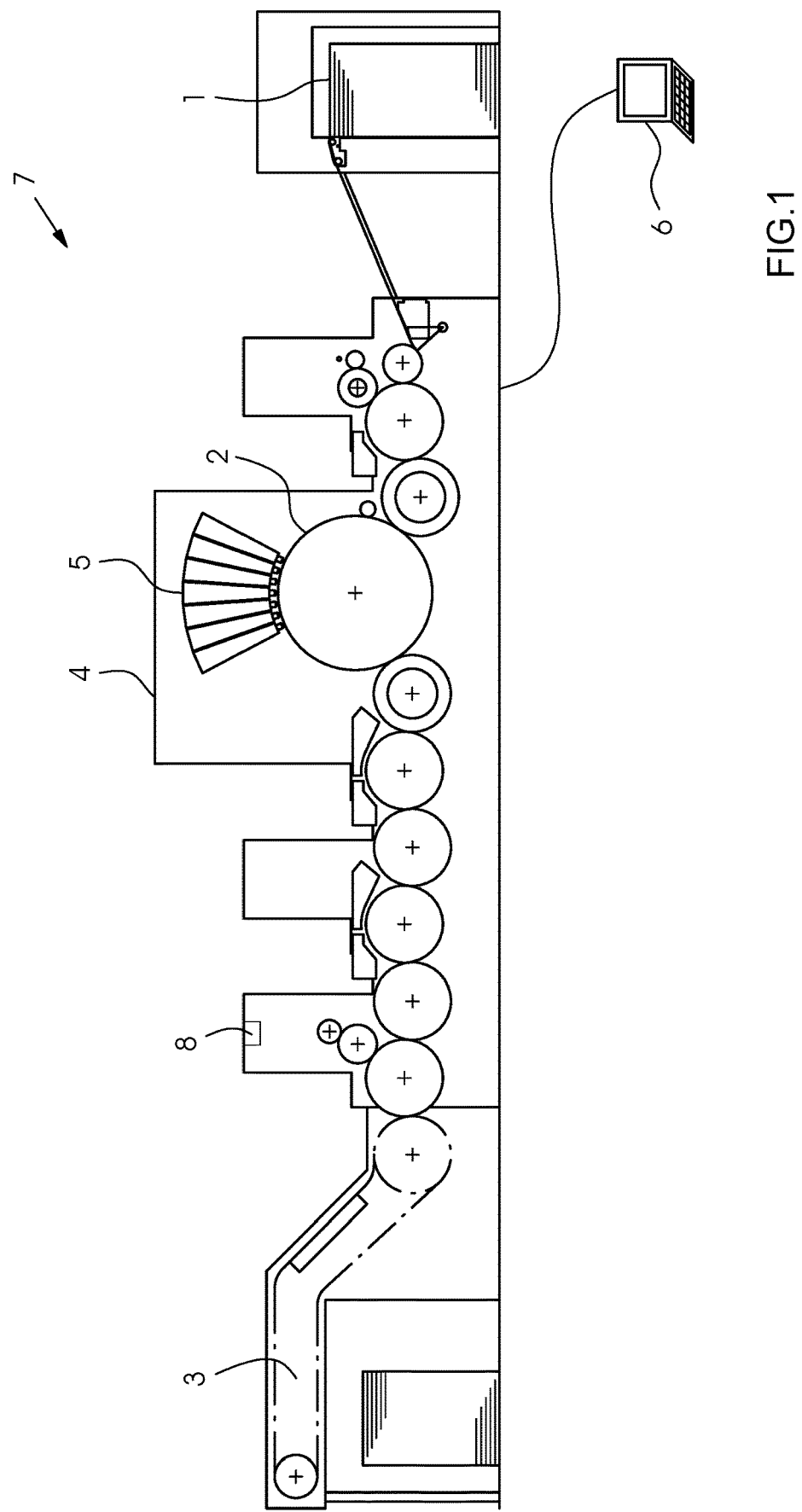
FIG. 1 is a longitudinal-sectional view of an example of a sheet-fed inkjet printing machine that is used in the context of the invention.

Referring now to the figures of the drawings in detail and first, particularly, to FIG. 1 thereof, it is seen that the field of application of the preferred exemplary embodiment is an inkjet printing machine 7. FIG. 1 shows an example of the fundamental configuration of such a machine 7, including a feeder 1 for feeding a printing substrate 2 to a printing unit 4, where it receives an image printed by print heads 5, as well as a delivery 3. The machine is a sheet-fed inkjet printing machine 7 controlled by a control unit or controller 6. In addition, an inline image recording system 8, including a camera system, may be provided downstream of the last print head 5.

Figure 2:
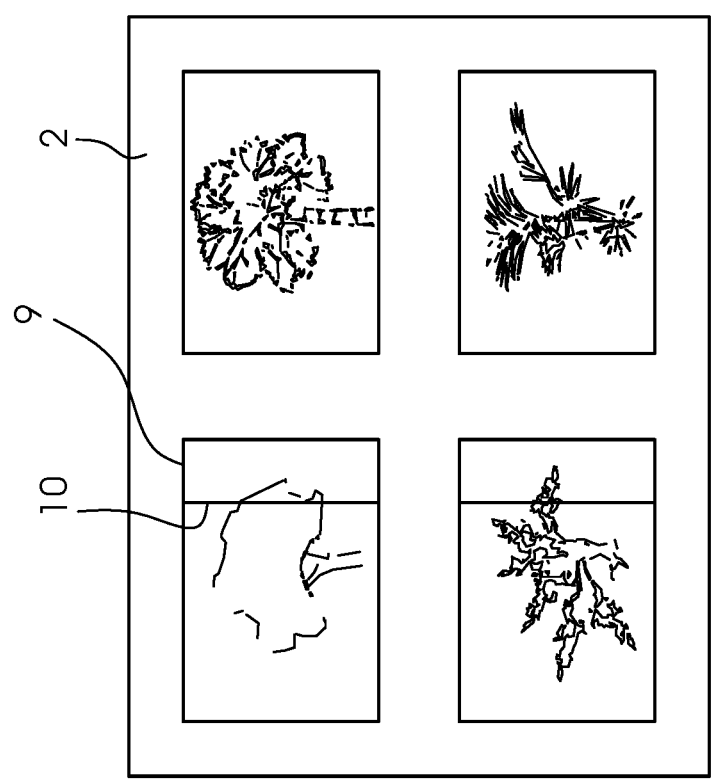
FIG. 2 is a plan view illustrating an example of a print with a white line.

While this printing machine 7 is in operation, individual printing nozzles in the print heads 5 in the printing unit 4 may fail as described above. Such a failure results in white lines 10 or, in the case of multicolor printing, in distorted color values. An example of such a white line 10 in a printed image 9 is shown in FIG. 2.

Figure 3:
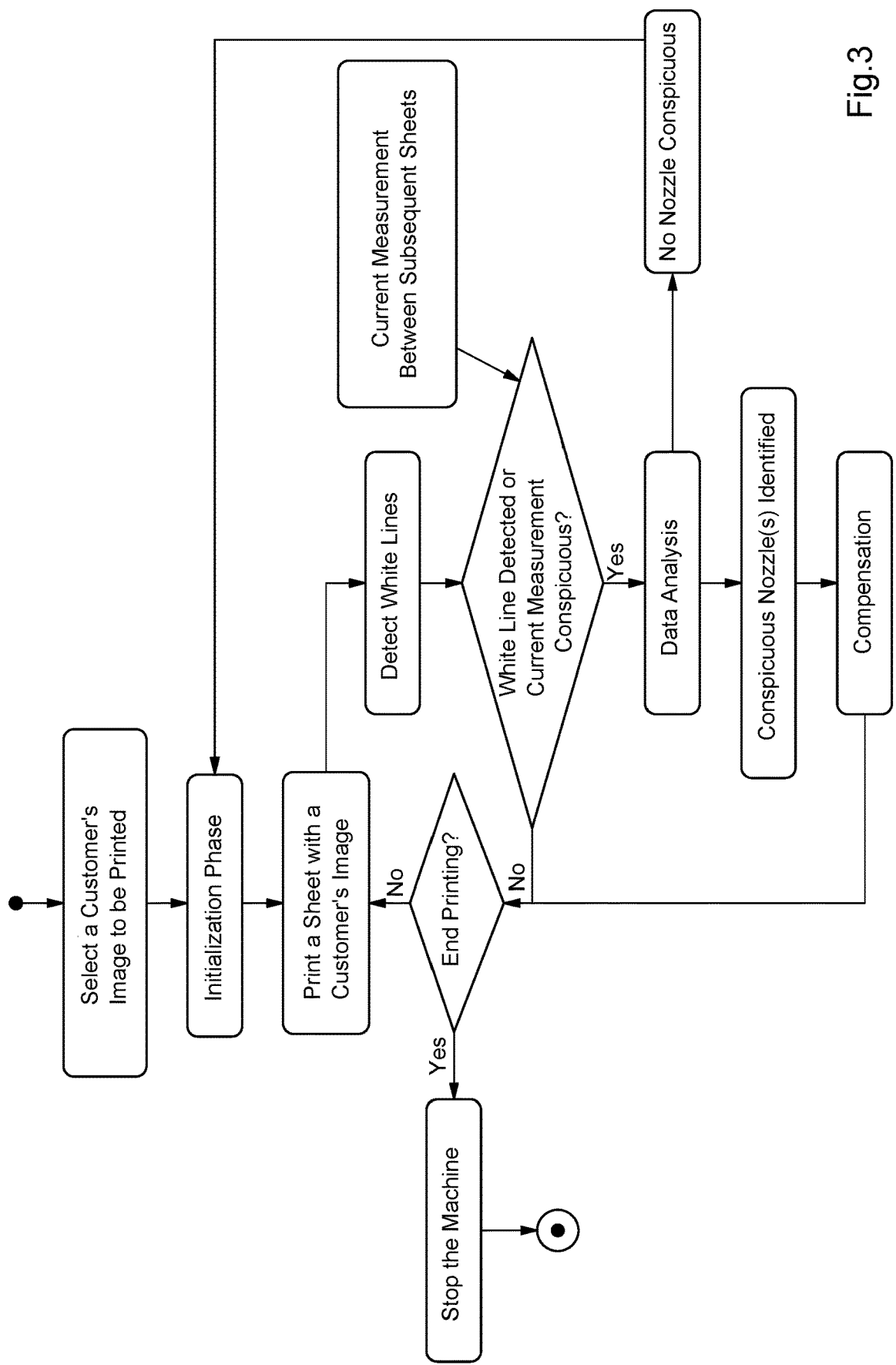
FIG. 3 is a schematic flow chart of the method of the invention.

The method of the invention is schematically illustrated in FIG. 3. It is implemented during an initializing phase of the inkjet printing machine 7. The initializing phase may be carried out after a washing operation. In this phase, a printing nozzle test chart is printed onto test sheets 2 and evaluated by using the image recording system 8. A computer then uses it for a pixel-nozzle mapping process in which the image pixels of the printing nozzle test chart that has been digitized by the image recording system 8 are allocated to the printing nozzles of the inkjet printing machine 7. The control unit 6 may be used as the computer. However, an image processing computer of the image recording system 8 is the preferred computer to be used.

Current measurements of the individual printing nozzles are taken between the individual test sheets 2 that are being printed. For reasons of time, a complete measurement of all printing nozzles needs to be taken cyclically between multiple print sheets. Moreover, a gray value area in which the computer 6 may then look for defects in the form of white lines 10 is printed and digitized. Thus, the elements of a printed test sheet 2 are:

a) an uncompensated gray value area to detect the artifacts or white lines 10, b) a printing nozzle test chart to determine amplitude and phase, c) three compensated gray value areas (middle, left-hand, and right-hand printing nozzles) to identify the printing nozzle that causes the white lines if the input values for the SVM model (current measurement, phase, amplitude) are inconspicuous.

Thus, in its preferred embodiment, the method of the invention progresses as follows:

1. After a washing operation, a customer's job is selected.

2. The first sheets 2 that are printed are test sheets 2 in accordance with the aforementioned definition. As few test sheets 2 as possible are printed. The number is a function of the printing format, of the number of possible current measurements between two print sheets 2, and the number of required measuring elements to train the SVM model. An important aspect in this context is to ensure that a minimum number of current measurements is taken at various printing nozzles, for instance at a minimum of 1000 nozzles.

3. In the recorded and digitized gray value area on the test sheet 2, a search is made for every color to find defective locations, i.e. camera pixels. The measured phase, amplitude, and current values of the printing nozzles that are located in the environment (middle nozzle±2 printing nozzles) of the defective camera pixels and therefore represent defective nozzle candidates are excluded from the training of the SVM model to ensure that only correct values are taught in. The accumulated information, namely phase, amplitude, current measurements of the good printing nozzles (that are "non-candidates") are then used to train the SVM model. The SVM model that has been trained in this way is then used to identify the defective nozzles among the "candidates." If no conspicuous printing nozzle is found in the environment of at least one white line 10, three compensated gray value areas for the process color in question are printed onto a new test sheet 2: area 1 with compensation for the middle nozzle, area 2 with compensation for the left-hand nozzle, and area 3 with compensation for the right-hand nozzle in a manner analogous with the left-hand nozzle. In this context, "left-hand" and "right-hand" are understood to indicate the first left-hand/right-hand nozzle adjacent the middle nozzle in accordance with pixel-nozzle mapping. These three areas are then used to identify the printing nozzles that cause the defect.

4. Then the customer's image 9 itself is printed in a production printing process. During this stage, a continuous search is made for white lines 10, i.e. defective camera pixels, in the printed customer's image 9, and continuous current measurements are taken for all nozzles in a cyclical way. If at least one white line 10 has been detected in the customer's image 9, the existing measurement data are used to find the printing nozzle that has caused it in the environment of the white lines. If no conspicuous printing nozzle has been found for at least one white line 10, the next step is to repeat the initializing phase. In addition, further nozzles are preventively deactivated with the aid of the current measurement if the current measurement thresholds are violated.

Alternatively, the method also works without the current measurements at the nozzle channels. In an alternative method without current measurements, the SVM model is trained with phase and amplitude. Subsequently, white lines 10 in the form of "defective" camera pixels are looked for in the customer's image 9 while the latter is being printed. The nozzle that caused the defect is then identified with the aid of a printing nozzle test chart and the three gray value areas with compensation that are printed onto a separate interjected test sheet 2 or onto the leading or trailing edge of an oncoming sheet 2 bearing the customer's image 9.

Nevertheless, current measurements result in a more accurate SVM model and help to reduce false positives and achieve more true positives. In addition, fewer unusable prints are produced. Therefore, the embodiment including current measurements is particularly preferred.

In summary, an advantage of the method of the invention is that fewer unusable prints are created because the method does without test charts such as printing nozzle test charts or gray value areas at the trailing edge of the sheet 2. Moreover, it has more true positives/fewer false positives due to the combination of current measurements and data referring to phase and amplitude.

The following is a summary list of reference numerals and the corresponding structure used in the above description of the invention:

1 feeder
2 current printing substrate/current print sheet
3 delivery
4 inkjet printing unit
5 inkjet printing head
6 computer
7 inkjet printing machine
8 image recording system including (a) camera(s)
9 print image/customer's image
10 white lines

The invention claimed is:

1. A method for detecting and compensating for defective printing nozzles in an inkjet printing machine, the method comprising:

printing test sheets each including at least one printing nozzle test chart and at least one gray area for every respective color separation being used;
recording and digitizing the test sheets with subsequent pixel-nozzle mapping and amplitude/phase value determination carried out by a computer, and using the computer to examine the at least one gray area for potential print defects when detecting and digitalizing the test sheets;
taking current measurements at the printing nozzles in between the test sheets being printed;
teaching in a SVM model with results of the current measurement and pixel- nozzle mapping and amplitude/phase determination carried out by the computer;
applying the taught-in SVM model to printed, recorded and digitized customer's images to detect defective printing nozzles during production printing on the inkjet printing machine;
during production printing, searching for potential print defects in the customer's images having been produced and then identifying the printing nozzle having caused the potential print defect by using the taught-in SVM model; and
compensating for the detected defective printing nozzles.

2. The method according to claim 1, which further comprises taking further current measurements in between individual print sheets being printed during production printing to be evaluated by the computer, for preventively deactivating and compensating for nozzles being conspicuous in terms of the current measurements.

3. The method according to claim 1, which further comprises recording, digitizing and evaluating both the test sheets and the customer's images produced during production printing by using an inline image recording system, and using an image-processing computer of the inline image recording system as the computer.

4. The method according to claim 1, which further comprises, excluding the results of current measurements and amplitude/phase value determination of nozzles in a defined environment of potential print defects from the teaching-in of the SVM model.

5. The method according to claim 4, which further comprises, when the computer does not find any printing nozzles with at least one of deviating amplitude or deviating phase values in the specified environment of the potential print defects:

printing three further gray areas for a color separation in addition to a gray area without printing nozzle compensation for detecting defective printing nozzles and in addition to the printing nozzle test chart for amplitude/phase value determination;
the three gray areas including one gray area in which the printing nozzle having been identified by using pixel-nozzle mapping has been deactivated and compensated for, one gray area in which a neighboring printing nozzle to the left has been deactivated and compensated for, and one gray area in which a neighboring printing nozzle to the right has been deactivated and compensated for;
and using the computer to identify the printing nozzle causing the potential print defect by evaluating the three gray areas.

* * * * *